United States Patent
Lee

(10) Patent No.: US 12,506,234 B2
(45) Date of Patent: Dec. 23, 2025

(54) SECONDARY BATTERY

(71) Applicant: SAMSUNG SDI CO., LTD., Yongin-si (KR)

(72) Inventor: Hyun Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 654 days.

(21) Appl. No.: 17/888,784

(22) Filed: Aug. 16, 2022

(65) Prior Publication Data

US 2023/0207996 A1 Jun. 29, 2023

(30) Foreign Application Priority Data

Dec. 28, 2021 (KR) .................. 10-2021-0189721

(51) Int. Cl.
| | |
|---|---|
| *H01M 50/593* | (2021.01) |
| *H01M 10/0525* | (2010.01) |
| *H01M 50/148* | (2021.01) |
| *H01M 50/531* | (2021.01) |
| *H01M 50/547* | (2021.01) |

(52) U.S. Cl.
CPC ..... *H01M 50/593* (2021.01); *H01M 10/0525* (2013.01); *H01M 50/148* (2021.01); *H01M 50/531* (2021.01); *H01M 50/547* (2021.01)

(58) Field of Classification Search
None
See application file for complete search history.

(56) References Cited

U.S. PATENT DOCUMENTS

| | | | |
|---|---|---|---|
| 8,951,663 B2 | 2/2015 | Kim | |
| 9,478,774 B2* | 10/2016 | Byun | H01M 50/176 |
| 9,634,299 B2* | 4/2017 | Kim | H01M 50/578 |
| 9,666,839 B2 | 5/2017 | Kim | |
| 10,826,048 B2 | 11/2020 | Kwak | |
| 2012/0121971 A1 | 5/2012 | Kim | |
| 2015/0140414 A1 | 5/2015 | Kim | |
| 2019/0067664 A1 | 2/2019 | Kwak | |
| 2019/0140250 A1* | 5/2019 | Wakimoto | H01M 50/55 |
| 2019/0237742 A1* | 8/2019 | Takabayashi | H01M 50/627 |
| 2019/0319295 A1* | 10/2019 | Kim | H01M 50/176 |
| 2022/0200105 A1* | 6/2022 | Yamamoto | H01M 50/547 |
| 2024/0006730 A1* | 1/2024 | Lee | H01M 50/103 |

FOREIGN PATENT DOCUMENTS

| | | |
|---|---|---|
| KR | 10-2012-0052185 A | 5/2012 |
| KR | 10-1720611 B1 | 3/2017 |
| KR | 10-2019-0024292 A | 3/2019 |

\* cited by examiner

Primary Examiner — Kevin M Bernatz
(74) Attorney, Agent, or Firm — Womble Bond Dickinson (US) LLP

(57) ABSTRACT

A secondary battery includes: an electrode assembly including a first electrode tab and a second electrode tab; a first current collector plate electrically connected to the first electrode tab; a case in which the first current collector plate and the electrode assembly are accommodated; a cap plate sealing an upper end of the case and including a coupling protrusion protruding downward; and an insulating member coupled to and fixed to the coupling protrusion at a lower portion of the cap plate, and the first current collector plate is coupled to a coupling hook located under the insulating member to be fixed.

10 Claims, 7 Drawing Sheets

SECONDARY BATTERY

CROSS-REFERENCE TO RELATED APPLICATION

This application claims priority to and the benefit of Korean Patent Application No. 10-2021-0189721, filed on Dec. 28, 2021 in the Korean Intellectual Property Office, the entire content of which is herein incorporated by reference.

BACKGROUND

1. Field

Aspects of embodiments of the present disclosure relate to a rechargeable battery.

2. Description of the Related Art

Unlike primary batteries which are not rechargeable, rechargeable secondary batteries can be charged and discharged. Low-capacity secondary batteries in which one battery cell is packaged in the form of a pack are widely employed in small-sized portable electronic devices, such as mobile phones, camcorders, etc., while a large-capacity secondary battery module in the form of a battery pack unit in which dozens of battery packs are connected to one another is typically used for driving motors of hybrid automobiles, etc.

A secondary battery may be configured by incorporating into a case an electrode assembly formed with a separator interposed between positive and negative electrode plates, and an electrolyte, and then installing a cap plate on the case. Here, a typical example of the electrode assembly may be a winding type or a stack type. In such an electrode assembly, an electrode tab may protrude in an upward or lateral direction, and a current collector plate may be connected to the electrode tab.

The above information disclosed in this Background section is provided for enhancement of understanding of the background of the invention and, therefore, it may contain information that does not constitute prior art.

SUMMARY

According to an aspect of embodiments of the present disclosure, a secondary battery is provided in which a current collector plate is fixed by a coupling hook provided in an insulating member, thereby preventing or substantially preventing bending of the current collector plate due to the weight of an electrode assembly.

According to another aspect of embodiments of the present disclosure, a secondary battery is provided in which an insulating member is fixed by a coupling hook provided in a cap plate, thereby improving a coupling force between a cap assembly and the insulating member.

These and other aspects and features of the present disclosure will be described in or will be apparent from the following description of some example embodiments of the present disclosure.

According to one or more embodiments of the present disclosure, a secondary battery includes an electrode assembly including a first electrode tab and a second electrode tab, a first current collector plate electrically connected to the first electrode tab, a case in which the first current collector plate and the electrode assembly are accommodated, a cap plate sealing an upper end of the case and including a coupling protrusion protruding downward, and an insulating member coupled to and fixed to the coupling protrusion at a lower portion of the cap plate, wherein the first current collector plate is coupled to a coupling hook located under the insulating member to be fixed.

In one or more embodiments, the secondary battery may further include a first terminal electrically connected to the first current collector plate and exposed to an upper portion of the cap plate.

In one or more embodiments, the first terminal may be adjacent to an end of the cap plate, and a first distance that is a distance from the end of the cap plate to the first terminal may be equal to or greater than ⅕ of a length from the end to another end of the cap plate.

In one or more embodiments, a second distance that is a distance from the end of the cap plate to the coupling protrusion may be equal to or less than ½ of the first distance.

In one or more embodiments, a third distance that is a distance from the end of the cap plate to the coupling hook may be equal to or less than ½ of the first distance.

In one or more embodiments, the coupling protrusion may include a first coupling protrusion surface coupled to the insulating member to support the insulating member, and a second coupling protrusion surface connected to the first coupling protrusion surface, and a projection-included angle between the first coupling protrusion surface and the second coupling protrusion surface is 90 degrees or less.

In one or more embodiments, the coupling protrusion may be inserted into an insertion hole formed in the insulating member and coupled to the insulating member, and may extend along a circumferential direction of the insertion hole to fix the insulating member.

In one or more embodiments, the coupling protrusion may be inserted into an insertion hole formed in the insulating member and coupled to the insulating member, and may be elastically and movably deformed in being inserted into the insertion hole.

In one or more embodiments, the first current collector plate may include a first electrode connection part connected to the first electrode tab, and a first terminal connection part vertically connected to the first electrode connection part, and the coupling hook may be coupled to the first terminal connection part to fix the first terminal connection part and thereby fix the first electrode connection part.

In one or more embodiments, the coupling hook may include a first coupling hook surface coupled to the first current collector plate to support the first current collector plate, and a second coupling hook surface connected to the first coupling hook surface, and a hook-included angle between the first coupling hook surface and the second coupling hook surface may be 90 degrees or less.

DETAILED DESCRIPTION

Figure 1:
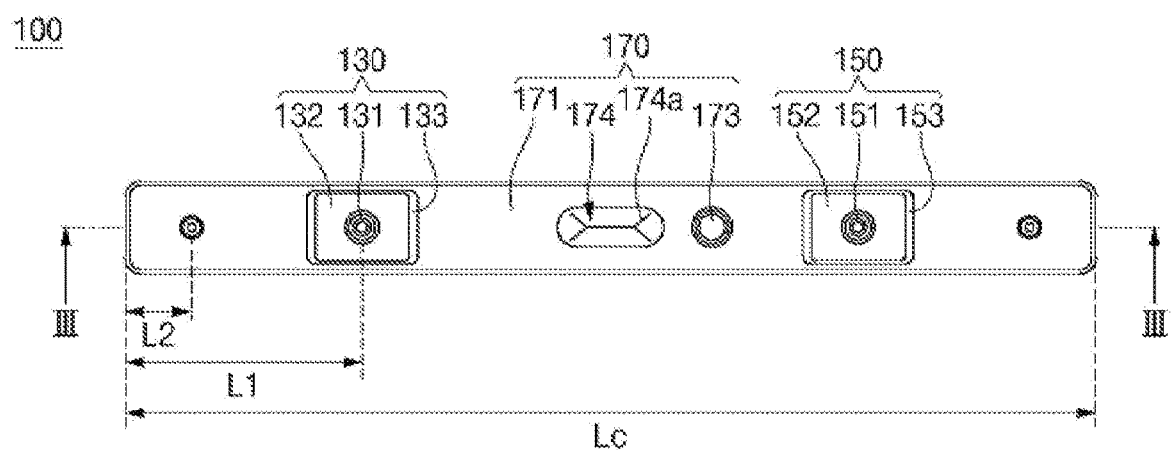
FIG. 1 is a plan view of a secondary battery according to an embodiment of the present disclosure.

Herein, some embodiments of the present invention will be described in further detail with reference to the accompanying drawings.

Some example embodiments of the present invention are provided to more completely explain the present invention to those skilled in the art; however, the following examples may be modified in various other forms. That is, the present invention may be embodied in many different forms and should not be construed as being limited to the example embodiments set forth herein. Rather, these example embodiments are provided so that this disclosure will be thorough and complete and will convey aspects and features of the present invention to those skilled in the art.

In addition, in the accompanying drawings, sizes or thicknesses of various components may be exaggerated for brevity and clarity. Like numerals refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if an element or feature in the figures is turned over, elements described as "below" or "beneath" other elements or features would then be oriented "on" or "above" the other elements or features. Thus, the example term "below" can encompass both an orientation of above and below.

Although the terms used in embodiments may be selected from generally known and used terms, the terms used herein may be varied depending on an operator's intention or customs in the art, advent of new technology, or the like. In addition, some of the terms mentioned in the description of the present disclosure may be selected by the applicant at his or her discretion, and the detailed meanings of which may be described in relevant parts of the description herein. Further, the present invention may be understood, not simply by the actual terms used, but by the meanings of the terms.

Expressions such as "comprises" or "may include" that may be used in various embodiments of the present disclosure indicate the existence of the disclosed corresponding function, operation, or component, and do not limit one or more additional functions, operations, or components. In addition, in various embodiments of the present disclosure, it is to be understood that terms, such as "comprise" or "have," are intended to designate that a feature, number, step, operation, component, part, or combinations thereof described in the specification is present, but are not intended to preclude the possibility of the existence or addition of other features, numbers, steps, operations, components, parts, or combinations thereof.

It is to be understood that when a component is referred to as being connected to another component, the components may be directly connected to each other, but, also, one or more other components may be present between the component and the another component. However, it is to be understood that when a component is referred to as being "directly connected" to another component, no other component exists between the component and the another component.

The terminology used herein is for the purpose of describing particular example embodiments and is not intended to be limiting of various example embodiments. As used herein, the singular forms are intended to include the plural forms as well, unless the context clearly indicates otherwise.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Herein, with reference to the accompanying drawings, some embodiments of the present invention will be described in further detail so that those skilled in the art can easily carry out the present invention. However, the present invention may be embodied in many different forms and is not limited to the embodiments described herein.

Figure 2:
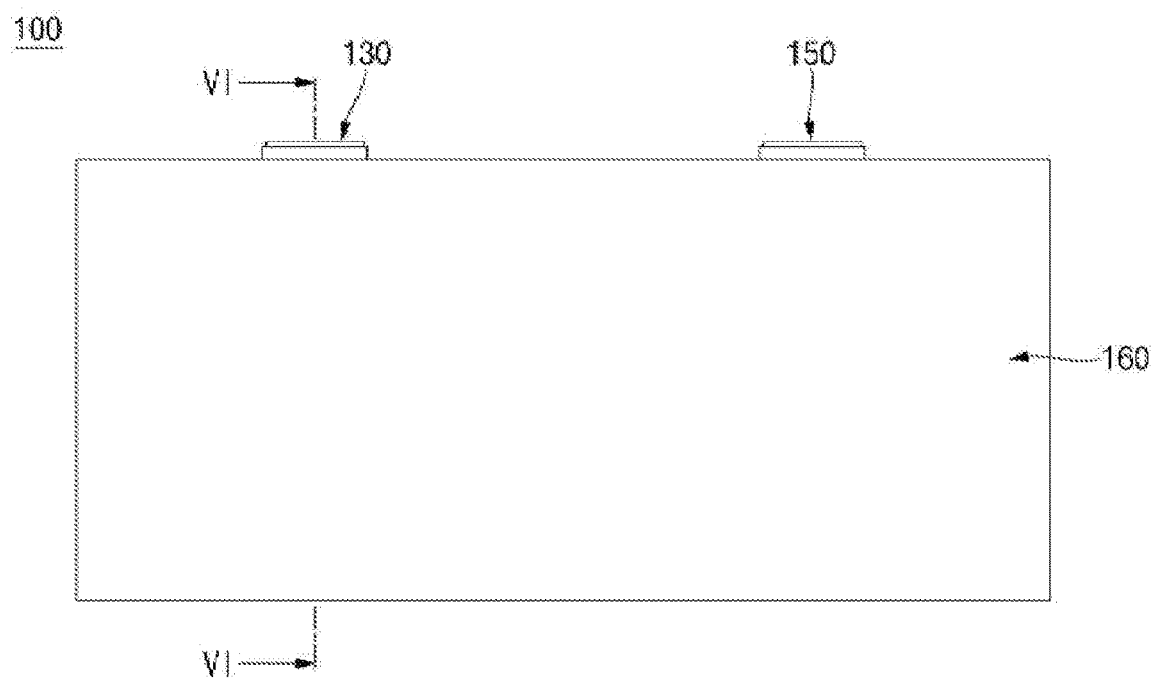
FIG. 2 is a front view of the secondary battery according to an embodiment of the present disclosure.
Figure 3:
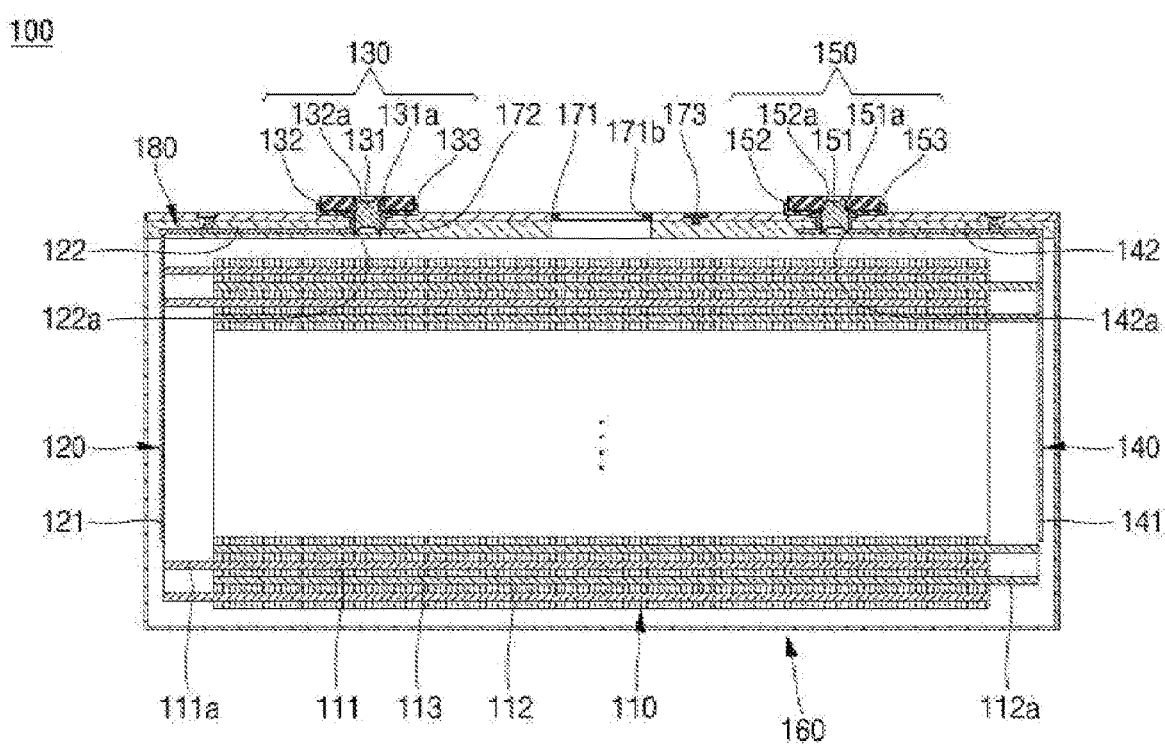
FIG. 3 is a cross-sectional view of the secondary battery according to an embodiment of the present disclosure, taken along the line III-Ill of FIG. 1.
Figure 4:
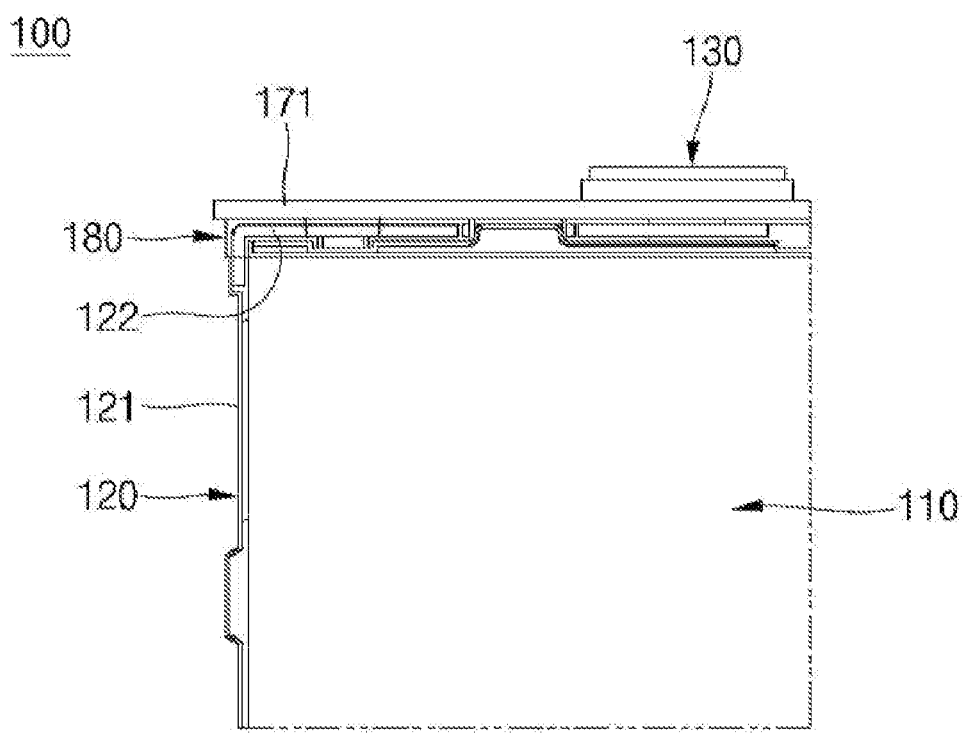
FIG. 4 is a view illustrating an electrode assembly, a first current collector plate, a cap assembly, and an insulating member in the secondary battery according to an embodiment of the present disclosure.
Figure 5A:
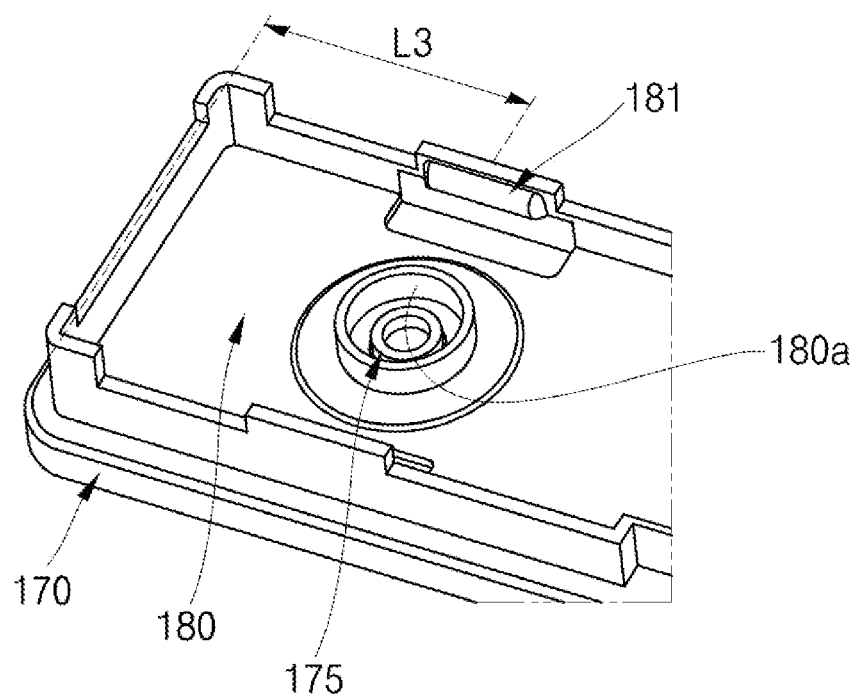
FIG. 5A is a bottom perspective view illustrating a state in which a cap plate and an insulating member are combined.
Figure 5B:
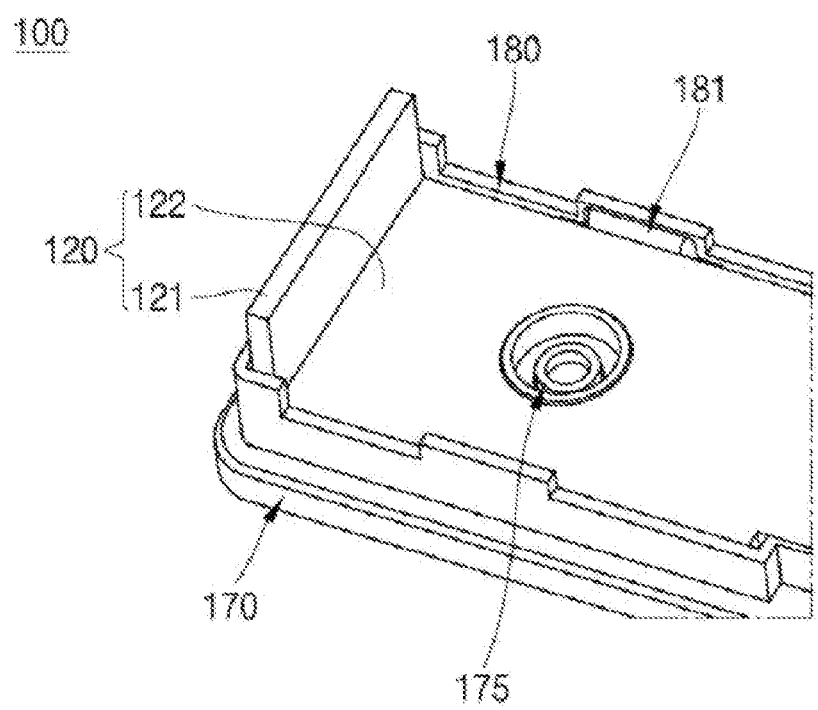
FIG. 5B is a bottom perspective view illustrating a state in which a first current collector plate is combined with reference to FIG. 5A.
Figure 6:
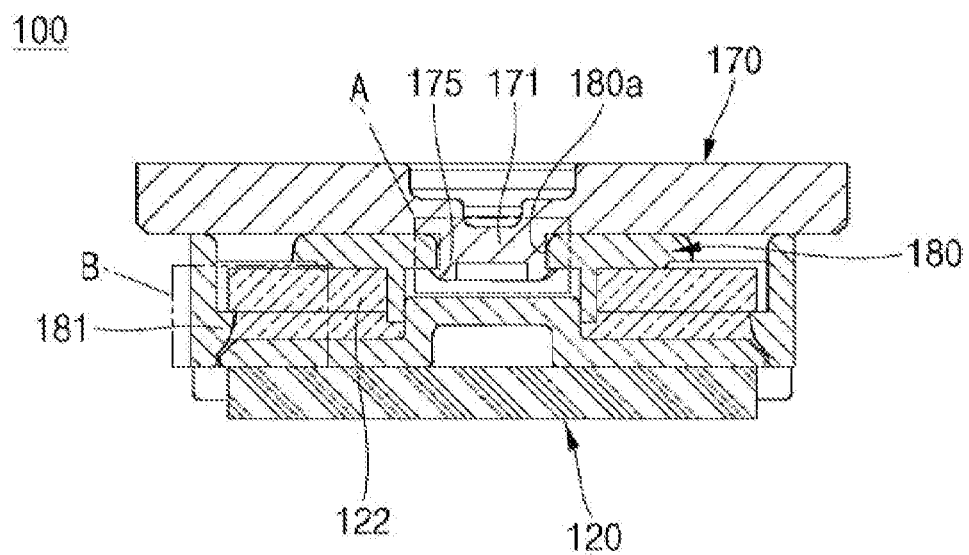
FIG. 6 is a cross-sectional view of the secondary battery according to an embodiment of the present disclosure, taken along the line VI-VI of FIG. 2.
Figure 7:
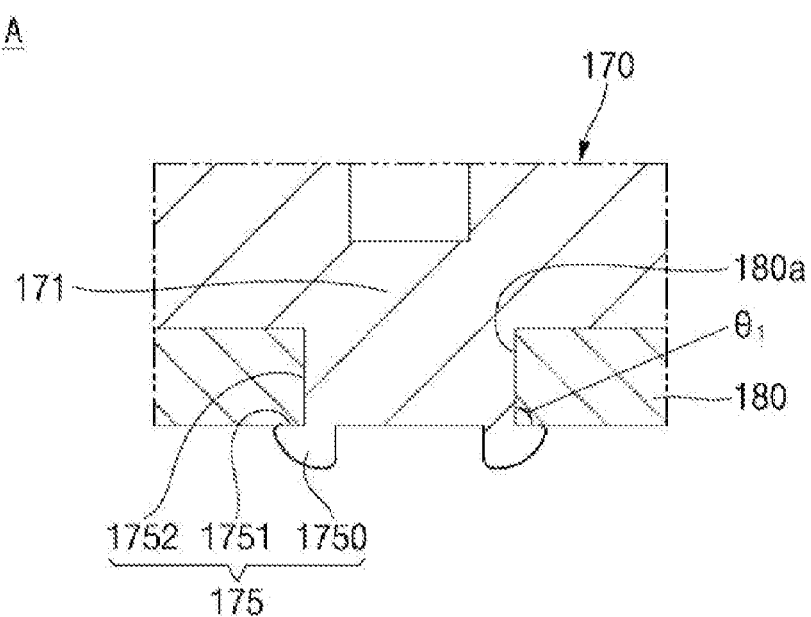
FIG. 7 is an enlarged view of a region "A" of FIG. 6.
Figure 8:
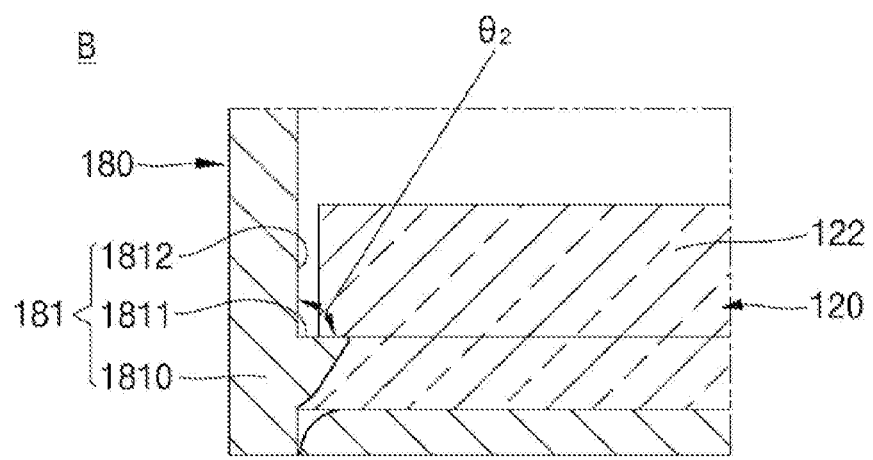
FIG. 8 is an enlarged view of a region "B" of FIG. 6.

FIG. 1 is a plan view of a secondary battery according to an embodiment of the present disclosure; and FIG. 2 is a front view of the secondary battery according to an embodiment of the present disclosure. In addition, FIG. 3 is a cross-sectional view of the secondary battery according to an embodiment of the present disclosure taken along the line III-III of FIG. 1; and FIG. 4 is a view illustrating an electrode assembly, a first current collector plate, a cap assembly, and an insulating member in the secondary battery according to an embodiment of the present disclosure. In addition, FIG. 5A is a bottom perspective view illustrating a state in which a cap plate and an insulating member are combined; and FIG. 5B is a bottom perspective view illustrating a state in which a first current collector plate is combined with reference to FIG. 5A. In addition, FIG. 6 is a cross-sectional view of the secondary battery according to an embodiment of the present disclosure taken along the line VI-VI of FIG. 2; FIG. 7 is an enlarged view of a region "A" of FIG. 6; and FIG. 8 is an enlarged view of a region "B" of FIG. 6.

Herein, a secondary battery according to an embodiment of the present disclosure will be described with reference to FIGS. 1 to 8.

A secondary battery 100 according to an embodiment of the present disclosure includes an electrode assembly 110, a first current collector plate 120, a first terminal 130, a second current collector plate 140, a second terminal 150, a case 160, a cap assembly 170, and an insulating member 180. However, components of the secondary battery 100 according to an embodiment of the present disclosure are not limited thereto, and components according to an embodiment may be added and/or at least one component may be omitted.

The electrode assembly 110 may be formed by winding or overlapping a laminate of a first electrode 111, a separator 113, and a second electrode 112, which are shaped of thin plates or films. In an embodiment, the first electrode 111 may operate as a positive electrode, and the second electrode 112 may operate as a negative electrode.

The first electrode 111 may be formed by coating a first electrode active material, such as a transition metal oxide, on a first electrode current collector formed of a metal foil, such as aluminum, and may include a first electrode tab 111a that is a region to which the first active material is not applied. The first electrode tab 111a serves as a passage for current flow between the first electrode 111 and an outside of the first electrode 111. However, the present disclosure does not limit the material of the first electrode 111.

The second electrode 112 may be formed by coating a second electrode active material, such as graphite or carbon, on a second electrode current collector formed of a metal foil, such as copper or nickel, and may include a second electrode tab 112a that is a region to which the second active material is not applied. The second electrode tab 112a serves as a passage for current flow between the second electrode 112 and an outside of the second electrode 112. However, the present disclosure does not limit the material of the second electrode 112.

The separator 113 may be interposed between the first electrode 111 and the second electrode 112 to prevent or substantially prevent an electric short and to enable the movement of lithium ions, and may include polyethylene, polypropylene, or a composite film of polyethylene and polypropylene. However, the present disclosure does not limit the material of the separator 113.

The first current collector plate 120 and the second current collector plate 140, which are electrically connected to the first electrode 111 and the second electrode 112, respectively, may be coupled to opposite ends of the electrode assembly 110. In an embodiment, the first current collector plate 120 and the second current collector plate 140 are coupled to the first and second electrode tabs 111a and 112a, which are at opposite ends of the electrode assembly 110, respectively.

The electrode assembly 110 is substantially accommodated in the case 160 together with an electrolyte. The electrolyte may include a lithium salt, such as $LiPF_6$ or $LiBF_4$, in an organic solvent, such as ethylene carbonate (EC), propylene carbonate (PC), diethyl carbonate (DEC), ethyl methyl carbonate (EMC), or dimethyl carbonate (DMC). In addition, the electrolyte may be in a liquid, solid, or gel phase.

The first current collector plate 120 includes a first electrode connection part 121 connected to the first electrode 111, and a first terminal connection part 122 bent and extending from an upper end of the first electrode connection part 121 and connected to the first terminal 130.

The first electrode connection part 121 is in contact with and coupled to the first electrode tab 111a protruding from an end of the electrode assembly 110 to be electrically connected to the first electrode 111. In an embodiment, the first electrode connection part 121 is welded to the first electrode tab 111a and has a vertically extended shape.

In an embodiment, the first terminal connection part 122 is shaped of a plate lying in a horizontal direction parallel to the cap plate 171 and includes a first terminal connection hole 122a penetrating between an upper surface and a lower surface thereof. In an embodiment, a first fastening terminal 131 of the first terminal 130 is fitted into and coupled to the first terminal connection hole 122a. That is, the first terminal connection hole 122a may be sized to correspond to the first fastening terminal 131 so as to accommodate the first fastening terminal 131. In an embodiment, the first terminal connection part 122 is welded to the first terminal 130, and may be interposed between a cap plate 171 of the cap assembly 170 and the electrode assembly 110 to be described further later. The first terminal connection part 122 may be arranged in a vertical direction from the upper end of the first electrode connection part 121.

The first terminal 130 is mainly formed of a metal or an equivalent thereof, and is electrically connected to the first current collector plate 120. In an embodiment, the first terminal 130 is disposed adjacent to an end of the cap plate 171. The first terminal 130 includes the first fastening terminal 131 accommodated in the first terminal connection hole 122a of the first current collector plate 120, a first electrode terminal 132 coupled to the first fastening terminal 131, and a first insulating plate 133 interposed between the first electrode terminal 132 and the cap plate 171.

In an embodiment, a first distance L1 that is a distance from the first terminal 130 to an end of the cap plate 171 may be equal to or greater than ⅕ of a length Lc from the end of the cap plate 171 to another end of the cap plate 171, as shown in FIG. 1. The first terminal 130 may be disposed to be biased toward the end of the cap plate 171 from a center of the cap plate 171. The center of the cap plate 171 may be a point at which the distances from the end and the another end of the cap plate 171 are the same.

The first fastening terminal 131 may extend and protrude upward by a length (e.g., a predetermined length) through the cap plate 171 to be described further later, and may be electrically connected to the first current collector plate 120 under the cap plate 171. The first fastening terminal 131 may extend and protrude upward by a length (e.g., a predetermined length), and may have a laterally extending first flange 131a formed at a lower portion of the first electrode terminal 132 so as to prevent or substantially prevent the first fastening terminal 131 from being dislodged from the cap plate 171. In an embodiment, a region formed under the first flange 131a of the first fastening terminal 131 may be fitted into the first terminal connection hole 122a of the first current collector plate 120, followed by riveting or welding. In addition, a region formed on the first flange 131a of the first fastening terminal 131 may penetrate the cap plate 171 to extend and protrude upward by a length (e.g., a predetermined length), and the first electrode terminal 132 may be fixed in the extending and protruding region.

In an embodiment, the first electrode terminal 132 is shaped of a plate having a first electrode terminal hole 132a penetrating through upper and lower surfaces thereof. The first electrode terminal 132 includes the first electrode terminal hole 132a on a side in a longitudinal direction of the cap plate 171.

The first electrode terminal hole 132a of the first electrode terminal 132 may be formed to correspond to a horizontal size and shape of the first fastening terminal 131 so as to accommodate the first fastening terminal 131. In an embodiment, in the first electrode terminal 132, the first fastening terminal 131 protruding upward from the cap plate 171 may be fitted into the first electrode terminal hole 132a, followed by riveting or welding.

The first fastening terminal 131 and the first electrode terminal 132 may be made of, for example, any of aluminum, an aluminum alloy, and equivalents thereof. However, the materials of the first fastening terminal 131 and the first electrode terminal 132 are not limited to these materials.

The first insulating plate 133 is interposed between the first electrode terminal 132 and the cap plate 171 to insulate the first electrode terminal 132 and the cap plate 171 from each other. In an embodiment, the first electrode terminal 132 may not be directly connected to the cap plate 171 by the first insulating plate 133, but may be electrically connected to the cap plate 171 by the first fastening terminal 131. In an embodiment, the first insulating plate 133 may be in close contact with the upper surface of the cap plate 171. In an embodiment, the first insulating plate 133 may also be in close contact with a sealing gasket 172 to be described below.

The second current collector plate 140 includes a second electrode connection part 141 connected to the second electrode 112, and a second terminal connection part 142 bent and extending from an upper end of the second electrode connection part 141 and connected to the second terminal 150. In an embodiment, the second current collector plate 140 may be made of a conductive material selected from copper, a copper alloy, and equivalents thereof. The second current collector plate 140 may have substantially the same structure as that of the first current collector plate 120.

The second terminal 150 is mainly formed of a metal or an equivalent thereof, and is electrically connected to the second current collector plate 140. The second terminal 150 is disposed adjacent to the another end of the cap plate 171. In an embodiment, the second terminal 150 includes a second fastening terminal 151 accommodated in a second terminal connection hole 142a of the second current collector plate 140, a second electrode terminal 152 coupled to the second fastening terminal 151, and a second insulating plate 153 interposed between the second electrode terminal 152 and the cap plate 171. In an embodiment, a laterally extending second flange 151a may be formed at a lower portion of the second electrode terminal 152 so as to prevent or substantially prevent the second fastening terminal 151 from being dislodged from the cap plate 171. In an embodiment, the second electrode terminal 152 is shaped of a plate having a second electrode terminal hole 152a penetrating upper and lower surfaces thereof. In an embodiment, the second terminal 150 has substantially the same structure as the first terminal 130. In an embodiment, the second fastening terminal 151 and the second electrode terminal 152 of the second terminal 150 may be made of a conductive material selected from copper, a copper alloy, and equivalents thereof.

In an embodiment, a distance from the second terminal 150 to the another end of the cap plate 171 may be equal to or greater than ⅕ of the length Lc from the end of the cap plate 171 to the another end of the cap plate 171. The second terminal 150 may be disposed to be biased toward the another end of the cap plate 171 from the center of the cap plate 171.

The case 160 is formed of a conductive metal, such as aluminum, an aluminum alloy, or nickel-plated steel, and is shaped of a hexahedron having an opening formed therein so as to allow the electrode assembly 110, the first collector plate 120, and the second collector plate 140 to be inserted and seated therein. The case 160 may include an accommodating space in which the electrode assembly 110, the first collector plate 120, and the second collector plate 140 may be accommodated. Although the opening is not shown in FIGS. 1 and 2 because the case 160 and the cap assembly 170 are shown in a coupled state, an upper peripheral portion of the case 160 may be a substantially open portion. In an embodiment, an inner surface of the case 160 is subjected to insulation treatment so as to be insulated from the electrode assembly 110, the first collector plate 120, and the second collector plate 140.

The cap assembly 170 is coupled to the case 160. In an embodiment, the cap assembly 170 includes the cap plate 171, the sealing gasket 172, a stopper 173, a safety vent 174, and a coupling protrusion 175.

The cap plate 171 seals the upper end of the case 160. An opening into which the electrode assembly 110, the first current collector plate 120, and the second current collector plate 140 may be inserted and seated may be formed at an upper end of the case 160. In an embodiment, the cap plate 171 may be formed of a same material as the case 160. In an embodiment, for example, the cap plate 171 may be coupled to the case 160 by laser welding. In an embodiment, the cap plate 171 is electrically connected to the first terminal 130, and, thus, the cap plate 171 may have a same polarity as the first terminal 130. In an embodiment, the cap plate 171 and the case 160 may have the same polarity.

The sealing gasket 172 is made of an insulating material and is formed between each of the first and second fastening terminals 131 and 151 and the cap plate 171 to seal a portion between the first fastening terminal 131 and the second fastening terminal 151 and the cap plate 171. The sealing gasket 172 prevents or substantially prevents external moisture from penetrating into the secondary battery 100 or prevents or substantially prevents the electrolyte contained in the secondary battery 100 from leaking out.

The stopper 173 seals an electrolyte injection hole (not shown) of the cap plate 171, and the safety vent 174 is installed in a vent hole 171b of the cap plate 171. In addition, a notch 174a may be formed in the safety vent 174 so as to be opened at a certain pressure (e.g., a set pressure).

Referring to FIGS. 5A, 5B, and 6, the coupling protrusion 175 protrudes downward. The coupling protrusion 175 may protrude downward from the cap plate 171. The coupling protrusion 175 is coupled to the insulating member 180 to fix the insulating member 180, thereby improving coupling force between the cap assembly 170 and the insulating member 180. In an embodiment, the coupling protrusion 175 may be integrally formed with the cap plate 171.

The coupling protrusion 175 may be inserted into an insertion hole 180a (shown in FIGS. 6 and 7) formed in the insulating member 180 to be coupled to the insulating member 180. The coupling protrusion 175 may extend along a circumferential direction of the insertion hole 180a.

The coupling protrusion 175 may be elastically and movably deformable in the process of being inserted into the insertion hole 180a. In the coupling process between the cap assembly 170 and the insulating member 180, the coupling protrusion 175 may be elastically deformed inward of the insertion hole 180a and thus can be easily inserted into the insertion hole 180a. The coupling protrusion 175 may include a material having elasticity.

In an embodiment, a second distance L2 that is a distance from the coupling protrusion 175 to the end of the cap plate 171, is equal to or less than ½ of the first distance L1. That is, the coupling protrusion 175 may be disposed at an intermediate point at which the distances spaced apart from the end of the cap plate 171 and the first terminal 130 are the same, or may be disposed to be biased toward the end of the cap plate 171 on the basis of the intermediate point. The coupling protrusion 175 is disposed adjacent to an end of the insulating member 180 to fix the insulating member 180, thereby preventing or substantially preventing the one end of the insulating member 180 from being bent downward.

Referring to FIG. 7, the coupling protrusion 175 includes a first coupling protrusion surface 1751 and a second coupling protrusion surface 1752.

The first coupling protrusion surface 1751 is coupled to the insulating member 180 to support the insulating member 180 upward. The first coupling protrusion surface 1751 may be disposed in a direction parallel to a direction in which the cap plate 171 extends. The first coupling protrusion surface 1751 may be formed on an outer surface of a body 1750 of the coupling protrusion 175.

The second coupling protrusion surface 1752 is connected to the first coupling protrusion surface 1751. In an embodiment, the second coupling protrusion surface 1752 may be connected to the first coupling protrusion surface 1751 while being perpendicular to the direction in which the cap plate 171 extends. The second coupling protrusion surface 1752 may be formed on the outer surface of the body 1750 of the coupling protrusion 175.

In an embodiment, a projection-included angle θ1 between the second coupling protrusion surface 1752 and the first coupling projection surface 1751 is 90° or less. If the projection-included angle θ1 exceeds 90°, the first coupling protrusion surface 1751 may have a surface inclined downward with respect to the second coupling projection surface 1752, such that the insulating member 180 may not be fixed to the coupling protrusion 175, and there may be a possibility of moving along the inclined surface. In the secondary battery 100 according to an embodiment of the present disclosure, the projection-included angle θ1 is 90° or less, thereby improving the coupling force between the cap assembly 170 and the insulating member 180.

Although not shown, the coupling protrusion 175 may include a first coupling protrusion located adjacent to the side of the cap plate 171, and a second coupling protrusion located at the another side of the cap plate 171. The first coupling protrusion fixes a side of the insulating member 180. The first coupling protrusion may be inserted into a first insertion hole formed on the side of the insulating member 180 to be coupled to the side of the insulating member 180. The second coupling protrusion fixes another side of the insulating member 180. The second coupling protrusion may be inserted into a second insertion hole formed on the another side of the insulating member 180 to be coupled to the another side of the insulating member 180. In an embodiment, the first coupling protrusion and the second coupling protrusion may have a same shape as each other.

In an embodiment, the distance L2 from the first coupling protrusion to the end of the cap plate 171 is equal to or less than ½ of the first distance L1. In an embodiment, a distance from the second coupling protrusion to the another end of the cap plate 171 is equal to or less than ½ of the first distance L1.

The insulating member 180 is formed between each of the first and second current collecting plates 120 and 140 and the cap plate 171 to prevent or substantially prevent an unnecessary electrical short. That is, the insulating member 180 prevents or substantially prevents a short circuit between the first current collecting plate 120 and the cap plate 171 and a short circuit between the second current collecting plate 140 and the cap plate 171.

Referring to FIGS. 5A, 5B, and 6, a coupling hook 181 is provided under the insulating member 180.

The coupling hook 181 protrudes toward the first current collector plate 120 and is coupled to the first current collector plate 120 to fix the first current collector plate 120. The coupling hook 181 supports the first terminal connection part 122 of the first current collector plate 120, thereby supporting the first electrode connection part 121 connected to the first terminal connection part 122. Since the first electrode tab 111a is coupled to the first electrode connection part 121, the coupling hook 181 prevents or substantially prevents the first current collector plate 120 from being bent downward by the electrode assembly 110.

In an embodiment, the coupling hook 181 is disposed to surround the first current collector plate 120 from the outside of the first current collector plate 120. The coupling hook 181 may extend along a direction in which the first terminal connection part 122 extends.

The coupling hook 181 may be elastically and movably deformable in a process of being coupled to the first current collector plate 120. In the process of coupling the insulating member 180 and the first current collector plate 120 to each other, the coupling hook 181 is elastically deformed to the outside of the first current collector plate 120, and thus can be easily attached to the first current collector plate 120. The coupling hook 181 may include a material having elasticity.

In an embodiment, a third distance L3 that is a distance from the coupling hook 181 to the end of the cap plate 171 is equal to or less than ½ of the first distance L1. That is, the coupling hook 181 may be disposed at an intermediate point at which the distances spaced apart from the end of the cap plate 171 and the first terminal 130 are the same, or may be disposed to be biased toward the end of the cap plate 171 on the basis of the intermediate point. The coupling hook 181 may be disposed adjacent to an end of the first current collecting plate 120 to fix the first current collector plate 120, thereby preventing or substantially preventing the end of the first current collecting plate 120 from being bent downward.

Referring to FIG. 8, the coupling hook 181 includes a first coupling hook surface 1811 and a second coupling hook surface 1812.

The first coupling hook surface 1811 is coupled to the first current collector plate 120 to support the first current collector plate 120 upward. The first coupling hook surface 1811 may be coupled to the first terminal connection part 122 to support the first terminal connection part 122. The first coupling hook surface 1811 may be formed on an outer surface of a main body 1810 of the coupling hook 181.

The second coupling hook surface 1812 is connected to the first coupling hook surface 1811. The second coupling hook surface 1812 may be connected to the first coupling hook surface 1811 while being perpendicular to a direction in which the first current collector plate 120 extends. The second coupling hook surface 1812 may be formed on the outer surface of the main body 1810 of the coupling hook 181.

In an embodiment, a hook-included angle θ2 between the second coupling hook surface 1812 and the first coupling hook surface 1811 is 90° or less. If the hook-included angle θ2 exceeds 90°, the first coupling hook surface 1811 may have a surface inclined downward with respect to the second coupling hook surface 1812, such that the first current collector plate 120 may not be fixed to the coupling hook 181, and there may be a possibility of moving along the inclined surface. In the secondary battery 100 according to an embodiment of the present disclosure, the hook-included angle θ2 is 90° or less, thereby stably preventing or substantially preventing the first current collector plate 120 from being bent downward.

Although not shown, the coupling hook 181 may include a first coupling hook coupled to the first current collector plate 120, and a second coupling hook coupled to the second current collector plate 140. The first coupling hook fixes the first current collector plate 120 to prevent or substantially prevent the first current collector plate 120 from being bent. The second coupling hook fixes the second current collector plate 140 to prevent or substantially prevent the second current collector plate 140 from being bent. In an embodiment, the first coupling hook and the second coupling hook may have a same shape as each other.

In an embodiment, a distance from the first coupling hook to the end of the cap plate 171 is equal to or less than ½ of the first distance L1. In an embodiment, the distance from the second coupling hook to the another end of the cap plate 171 is equal to or less than ½ of the first distance L1.

As described above, in the secondary battery according to one or more embodiments of the present disclosure, a current collector plate is fixed by a coupling hook provided in an insulating member, thereby preventing or substantially preventing bending of the current collector plate due to the weight of an electrode assembly.

In addition, in the secondary battery according to one or more embodiments of the present disclosure, an insulating member is fixed by a coupling hook provided in a cap plate, thereby improving a coupling force between a cap assembly and the insulating member.

While some embodiments are described above for carrying out the secondary battery according to the present disclosure, the present disclosure is not limited to the described embodiments, and it will be understood by those skilled in the art that various changes in form and details may be made therein without departing from the spirit and scope of the present disclosure as set forth by the following claims.

What is claimed is:

1. A secondary battery comprising:
    an electrode assembly comprising a first electrode tab and a second electrode tab;
    a first current collector plate electrically connected to the first electrode tab;
    a case in which the first current collector plate and the electrode assembly are accommodated;
    a cap plate sealing an upper end of the case and comprising a coupling protrusion protruding downward, the cap plate having a length along a longitudinal direction from an end of the cap plate to another end of the cap plate; and
    an insulating member coupled to and fixed to the coupling protrusion at a lower portion of the cap plate,
    wherein the first current collector plate is coupled to a coupling hook located under the insulating member to be fixed, the coupling hook being spaced apart from the coupling protrusion in a width direction intersecting the longitudinal direction.

2. The secondary battery of claim 1, further comprising a first terminal electrically connected to the first current collector plate and exposed to an upper portion of the cap plate.

3. The secondary battery of claim 2, wherein the first terminal is adjacent to the end of the cap plate, and a first distance that is a distance from the end of the cap plate to the first terminal is equal to or greater than ⅕ of a length from the end of the cap plate to the another end of the cap plate.

4. The secondary battery of claim 3, wherein a second distance that is a distance from the end of the cap plate to the coupling protrusion is equal to or less than ½ of the first distance.

5. The secondary battery of claim 3, wherein a third distance that is a distance from the end of the cap plate to the coupling hook is equal to or less than ½ of the first distance.

6. The secondary battery of claim 1, wherein the coupling protrusion is inserted into an insertion hole formed in the insulating member and coupled to the insulating member, and extends along a circumferential direction of the insertion hole to fix the insulating member.

7. The secondary battery of claim 1, wherein the coupling protrusion is inserted into an insertion hole formed in the insulating member and coupled to the insulating member, and is elastically and movably deformed in being inserted into the insertion hole.

8. The secondary battery of claim 1, wherein the first current collector plate includes a first electrode connection part connected to the first electrode tab, and a first terminal connection part vertically connected to the first electrode connection part, and the coupling hook is coupled to the first terminal connection part to fix the first terminal connection part and thereby fix the first electrode connection part.

9. A secondary battery comprising:
    an electrode assembly comprising a first electrode tab and a second electrode tab;
    a first current collector plate electrically connected to the first electrode tab;
    a case in which the first current collector plate and the electrode assembly are accommodated;
    a cap plate sealing an upper end of the case and comprising a coupling protrusion protruding downward; and
    an insulating member coupled to and fixed to the coupling protrusion at a lower portion of the cap plate,
    wherein the first current collector plate is coupled to a coupling hook located under the insulating member to be fixed, and
    wherein the coupling protrusion comprises a first coupling protrusion surface coupled to the insulating member to support the insulating member, and a second coupling protrusion surface connected to the first coupling protrusion surface, and a projection-included angle between the first coupling protrusion surface and the second coupling protrusion surface is 90 degrees or less.

10. A secondary battery comprising:
    an electrode assembly comprising a first electrode tab and a second electrode tab;
    a first current collector plate electrically connected to the first electrode tab;

a case in which the first current collector plate and the electrode assembly are accommodated;

a cap plate sealing an upper end of the case and comprising a coupling protrusion protruding downward; and an insulating member coupled to and fixed to the coupling protrusion at a lower portion of the cap plate, wherein the first current collector plate is coupled to a coupling hook located under the insulating member to be fixed, and wherein the coupling hook comprises a first coupling hook surface coupled to the first current collector plate to support the first current collector plate, and a second coupling hook surface connected to the first coupling hook surface, and a hook-included angle between the first coupling hook surface and the second coupling hook surface is 90 degrees or less.

* * * * *